INVENTOR.
CLIFFORD C. ANTHES

Aug. 11, 1964

C. C. ANTHES 3,144,044

APPARATUS FOR PROVIDING CLOSED VENTILATION OF AUTOMOTIVE CRANKCASES

Filed Dec. 6, 1962

INVENTOR.
CLIFFORD C. ANTHES
BY Leo A. Plum, Jr.
ATTORNEY

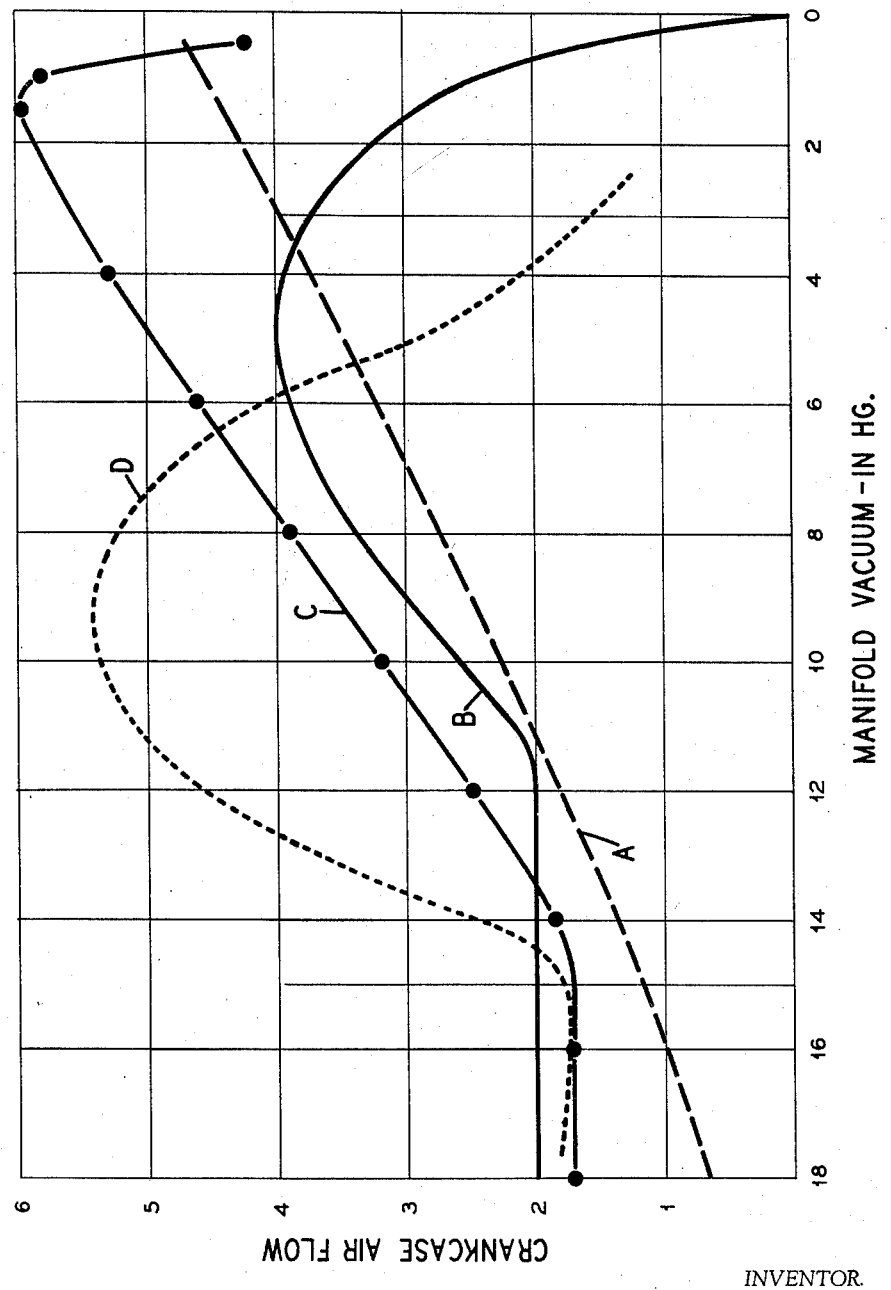

United States Patent Office 3,144,044
Patented Aug. 11, 1964

3,144,044
APPARATUS FOR PROVIDING CLOSED VENTILA-
TION OF AUTOMOTIVE CRANKCASES
Clifford C. Anthes, Union, N.J., assignor to Union
Carbide Corporation, a corporation of New York
Filed Dec. 6, 1962, Ser. No. 242,784
11 Claims. (Cl. 137—483)

This invention relates to prevention of pollution of the atmosphere by exhaust products from the crankcase of automotive internal combustion engines.

The problem of contamination of the air by the exhaust products of automotive internal combustion engines is receiving ever increasing attention because the amount of contaminants in the air, especially in urban areas, has become so great as to be injurious to the public health.

These contaminants in the exhaust products of internal combustion engines are made up of partially burned fuel gases and other harmful products. They are discharged into the air through the exhaust system of the engine and also as gases blown past the pistons in the cylinders of the engine into the crankcase. These contaminant-containing blowby gases are then discharged from the crankcase into the air through the oil fill cap or other secondary crankcase vent tubes. The amount of such gases blown by the pistons into the crankcase and thence into the air has been reported to be responsible for up to 50 percent of the total amount of contamination discharged into the air by the engines of automobiles, trucks, and buses.

It has been proposed to rid the crankcase of such blowby gases before they are discharged into the air by recycling them back into the engine where they can be more fully combusted. A common method of removing blowby gases from the crankcase uses a valved conduit connecting the crankcase and the intake manifold or carburetor system of the engine. The vacuum in the intake manifold and carburetor system (called herein the induction system) resulting from the induction or suction stroke of the engine draws the gases from the crankcase into the engine for further combustion. The degree of vacuum in the intake manifold and carburetor system varies with the speed and work load on the engine. The amount of contaminant-containing gases blown by the pistons also varies with the speed and work load on the engine, but in an inverse relationship to the variation in the degree of vacuum. Flow regulating valves have been used in an only partially successful attempt to use the induction system vacuum to draw gases from the crankcase and thereby prevent the pollution of the air by these blowby gases.

In the drawings:

FIG. 8 is a graphical representation of the actual blowby gas flow from an engine into its crankcase (dashed line) with the gas flow characteristics of prior art ventilating systems (solid line and dotted line) and the ventilating system of this invention (dash-dot line).

Figure 1:
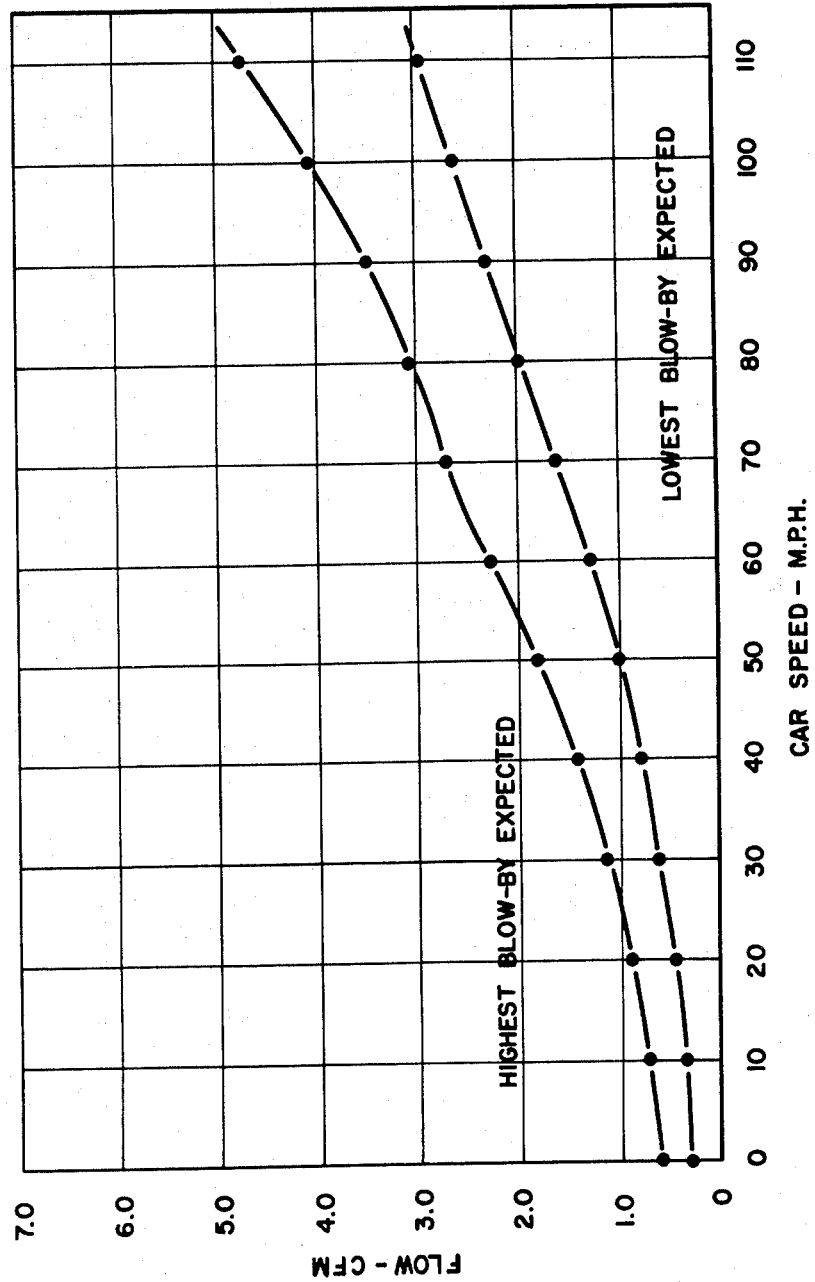
FIG. 1 is a graphical representation of the amount of contaminant-containing blowby gases blown past the pistons of an internal combustion engine as this amount varies with the speed of the vehicle.

In FIG. 1 it is seen that the amount of blowby gases blown into the crankcase increases with increasing vehicle speed or work load on the engine. The amount of blowby gases is at its lowest when the vehicle speed is zero, that is, when the engine is idling. The amount of blowby gases increases rapidly with increasing vehicle speed. The amount of blowby gas flow also increases with the work load on the engine so that the amount of blowby gases resulting from hill climbing or rapid acceleration can be as high as if the vehicle were operating at a speed of 60 to 100 miles per hour or more.

Figure 2:
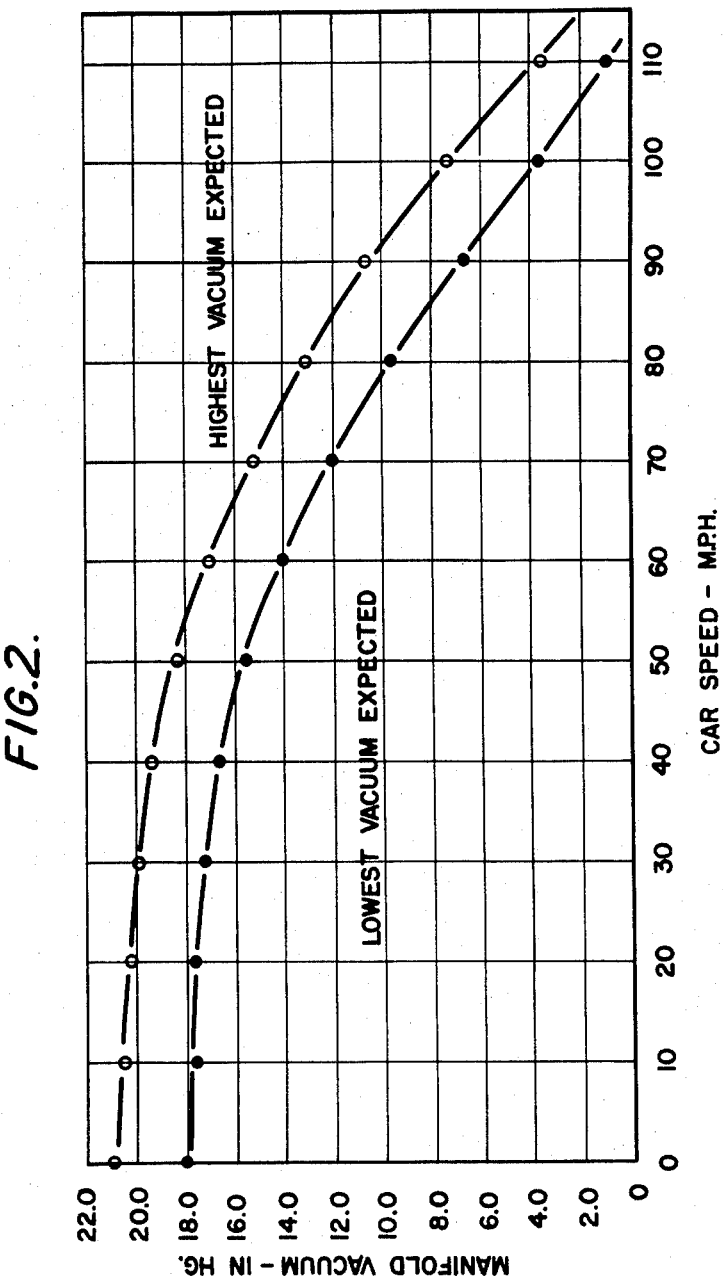
FIG. 2 is a graphical representation of the intake manifold vacuum showing the change in manifold vacuum with increasing vehicle speed.

In FIG. 2 it is shown that the intake manifold vacuum varies inversely with the vehicle speed, i.e., as the vehicle speed or work load increases, the vacuum in the intake manifold decreases, as does the vacuum in the carburetor system. Since some crankcase ventilating systems use the vacuum in the induction system to draw gases from the crankcase, the following situation arises—that the vacuum in the intake manifold (and the gas drawing power) is highest when the rate of flow of blowby gases is the lowest. This relationship is shown in FIG. 8 in terms of the performance of prior art crankcase ventilating systems and the performance of the ventilating system of this invention. In the graph the average blowby gas volume (dashed line A) is seen to increase while the intake manifold vacuum (abscissa) decreases. The solid line represents the actual performance of a prior art crankcase ventilator of the type using a spring loaded check valve in a conduit connecting the crankcase and the intake manifold. The check valve is opened by the pressure differential resulting from the high intake manifold negative presure at idle or low engine speeds at which time the valve allows a large volume of gases to enter the intake manifold. It is seen that the valve allows a considerably larger volume of gases to be drawn from the crankcase at low speeds (solid line B) than the volume of blowby gases actually being blown into the crankcase (dashed line A). This can be detrimental to efficient engine performance and to the lubricating system.

The large volume of gases drawn through the prior art spring loaded check valve by the high manifold vacuum at idling of the engine is made up of the small amount of blowby gas and a larger amount of air drawn into the crankcase from the oil fill cap or other vent tubes. While it may be desirable to draw a small amount of air from the oil fill cap into the crankcase to purge the crankcase of the corrosive blowby gases, it is not desirable to draw such large and unregulated amounts of air as shown in curve B in the graph as this would tend to upset the fuel-air ratio fed to the engine.

On the other hand, when the engine is operating at high speed (far right side of the graph) and the manifold vacuum decreases to near atmospheric pressure, the valve draws a lesser volume of gases from the crankcase than is being blown into the crankcase from the engine. This is shown in the graph in the area of three to zero inches of mercury manifold vacuum. The check valve, as shown by the curve B, draws less gas from the crankcase at these weak vacuum conditions than is being blown into the crankcase (curve B falls beneath curve A). The curve D shows the performance of another type of valve, to be discussed below, which similarly falls short of optimum performance. The result is that pollution of the atmosphere takes place through the oil fill cap despite the presence of the conduit from the crankcase to the intake manifold.

It is the object of this invention, therefore, to prvide a crankcase ventilating and recycling system which does not allow the escape of contaminant-containing blowby gases into the air under any of the varying conditions of car speed or work load on the engine.

It is another object of this invention to provide a crankcase ventilating and recycling system which does not overly disrupt engine performance by discharging into the intake manifold or drawing into the crankcase any unnecessary amounts of air.

Other aims and advantages of the invention will be apparent from the following description and the appended claims.

In accordance with these objects a flow control regulator is provided for use in a crankcase ventilating system, said regulator comprising a casing, a flexible diaphragm clamped within said casing dividing said casing into a first chamber and a second chamber, a gas inlet into said first chamber, said gas inlet having an engine crankcase connector, a gas outlet from said first chamber, said gas outlet having an engine intake manifold connector, a valve nozzle inside the first chamber, one end of said valve nozzle communicating with the gas outlet, the other end of said valve nozzle terminating in an open end adjacent the flexible diaphragm, said open end adapted to be at least partially blocked by the flexible diaphragm when the flexible diaphragm is drawn to the open end by engine manifold negative pressures in the valve nozzle, and a spring in said casing between said flexible diaphragm and a wall of the casing, said spring biasing the flexible diaphragm away from the valve nozzle to keep open said valve nozzle open end for outlet gas pressures equal to and more positive than a preselected outlet gas pressure.

As previously discussed the problem of air pollution by crankcase gases has been partially solved by venting the blowby gases from the crankcase and feeding or recycling these gases into the induction system of the engine, either into the carburetor system or directly into the intake manifold. This, in effect, provides a closed system for the crankcase ventilating circuit, compared to older arrangements where such gases were discharged into the atmosphere through the oil fill cap or secondary crankcase vent tubes. It has been found, however, that this venting of the crankcase should be accomplished without excessively varying the pressure in the crankcase over the full range of vehicle operating speeds and work loads. The direct result of operating the crankcase venting system with a nearly constant negative pressure in the crankcase is that the volume of gases drawn from the crankcase is substantially equal to the volume of gases blown past the piston rings into the crankcase over the full range of vehicle operating speeds and work loads.

It is, of course, necessary to draw all of the blowby gases from the crankcase at all engine work loads so that an effective prevention of atmospheric pollution can be accomplished. In other words, if the volume flow of blowby gases thruogh the feed back (or recycling) system is less than the volume flow of blowby gases into the crankcase, then there will be a tendency for the pressure of such gases in the crankcase to increase and, thus, for the blowby gases to be discharged into the atmosphere through the oil fill cap or the secondary vent tube. On the other hand, if the volume flow of gases drawn through the feed back conduit between the crankcase and engine induction system is greater than the volume flow of blowby gases into the crankcase, then there will exist an excessively low pressure area in the crankcase and atmospheric air will be pulled or sucked into the crankcase through the oil fill cap, secondary vent tubes, or other possible leakage points. The results of either condition can be undesirable. In the first instance, the protection against atmospheric pollution is incomplete. In the second instance, more air and gases are being fed back into the induction system of the engine than is necessary, thus increasing any tendency for these entering gases to upset the gas-air mixture ratio being fed to the engine cylinders.

Figure 3:
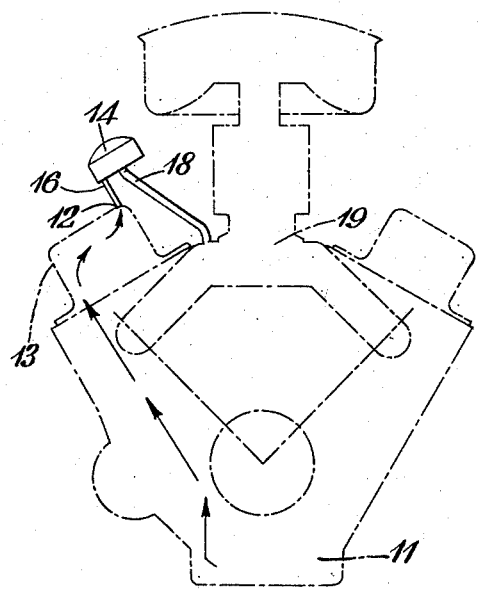
FIG. 3 is a phantom view showing a cross section of an internal combustion engine with a crankcase ventilating conduit and flow regulator of this invention connected to the intake manifold of the engine.
Figure 4:
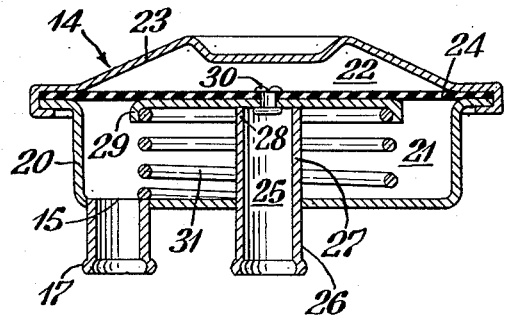
FIG. 4 is an elevational section of the flow regulator of FIG. 3.

The device described above will control the venting of the crankcase so as to avoid the above noted deficiencies. In FIGS. 3 and 4 an embodiment of the apparatus described above is shown. A flow regulator 14 is shown in a conduit connecting the crankcase and intake manifold of a typical engine. The crankcase 11 is communicated with the chamber under the valve cover 13 through passages as indicated by the arrows showing gas flow. A vent hole 12 in the valve cover allow passage of the gases to the conduit 16. The vent hole shown here is in the valve cover, but could be located any place providing access to the crankcase. The gases flow through the regulator 14 and then out through the conduit 18 and into the intake manifold 19.

The flow regulator 14 comprises a body 20 and a cap 23 which together make up a casing. The casing is divided into two chambers by a flexible diaphragm 24, shown in this embodiment sealingly clamped at its outer periphery between the body 20 and cap 23. The flexible diaphragm can be of the fabric inserted neoprene type. The two chambers formed in the casing by the diaphragm are the first chamber 21, and a second chamber 22 which is vented to the atmosphere. In the first chamber is a gas inlet 15 having an engine crankcase connector 17 which is connected to the conduit 16 to provide a passage for gases from the crankcase. The engine crankcase connector 17 may be mounted directly on the vent hole 12, in which case no conduit 16 is required. A gas outlet 25 from the first chamber 21 provides an exit for gases. The gas outlet 25 is provided with an engine intake manifold connector 26 which is connected to the conduit 18. A valve nozzle 27 extends into the first chamber with an open end 28 adjacent the diaphragm 24 so as to be at least partially shut off by the diaphragm when the diaphragm is drawn against the open end of the valve nozzle, as by a negative pressure in the gas outlet 25. The other end of the valve nozzle is connected to the intake manifold connector 26, in this embodiment these parts being a one piece tube open at both ends.

A diaphragm plate may be located between the flexible diaphragm 24 and the open end 28 of the valve nozzle 27. In this embodiment such a diaphragm plate 29 is shown with a rivet connection 30 to the diaphragm. A spring 31 is located in the casing to bias the flexible diaphragm away from the open end of the valve nozzle to keep the nozzle open for outlet gas pressures (intake manifold negative pressures) equal to and more positive than a preselected outlet gas pressure, as discussed below.

The spring 31 is shown here in the first chamber compressed between the wall of the casing and the diaphragm plate 29. This valve opening spring is a relatively light spring, having a force equal to the desired valve opening pressure times the effective diaphragm area opposite the valve nozzle opening.

The preselector pressure to be maintained at the regulator inlet, and hence in the crankcase chamber itself, is a negative pressure sufficient to draw all of the blowby gases out of the crankcase. While there is a sufficiently strong vacuum in the intake manifold to draw such blowby gases from the crankcase if a simple open tube connection is made from the manifold to the crankcase, such a procedure is not practical for the high manifold vacuums at low speeds are too high to be transmitted directly to the crankcase. The prior art valves, therefore, attempted to limit the strength of the suction at low engine speeds by interposing valves in the conduit to the crankcase. While these valves limited the suction at low speeds, and hence the amount of gases drawn into the manifold, they also limited the amount of gases that could be drawn from the crankcase at high speeds when the vacuums were weak and the blowby gas volume into the crankcase was high. The regulator of this invention provides a controlled flow of gases into the manifold, matching closely, as shown in curve C of FIG. 8, the very flow volume of blowby gases into the crankcase.

The operation of the regulator is as follows: the intake manifold vacuums are transmitted to the regulator through the conduit 18, intake manifold connector 26, and valve nozzle 27 with its open end 28 inside the first chamber. These negative pressures vary from 20 inches of mercury to less than about 1 inch of mercury. These intake manifold negative pressures act directly upon the flexible diaphragm 24 on an area about equal to the cross-sectional area of the opening 28, tending to pull the diaphragm 24 and its plate 29 against the open end of the valve nozzle to shut it. The spring 31 is used to push the diaphragm away from the open end of the valve nozzle when the blowby rate increases so that these gases may pass into the nozzle.

The spring 31 forces the diaphragm and its diaphragm plate away from the valve nozzle opening when the intake manifold vacuums tending to close the valve become weaker than the force of the spring tending to open the valve. The spring is selected so as to have a valve opening force equal to the force of a selected intake manifold negative pressure, say 16 or 15 inches of mercury. The diaphragm will, therefore, be drawn against the open end of the valve nozzle at high manifold vacuums, say 20 to 16 inches of mercury. The blowby flow rate at these high manifold vacuums is low and the small amount of blowby gases are drawn into the valve nozzle opening through various leakage points, or by a limited access port formed by a groove or hole in the diaphragm plate or nozzle, as discussed below. When the intake manifold vacuums become weaker, or more positive, say 16 or 15 inches negative pressure, the force of the spring pushes the diaphragm and the diaphragm plate away from the valve nozzle opening allowing a larger gas passage to the valve nozzle. The blowby gas flow rate is beginning to increase at these manifold pressures and gases are able to easily flow into the valve nozzle opening because of the larger access area. The now increasingly absolute, or more positive, pressures in the crankcase provide a lifting force against the diaphragm tending to push it further away from the valve nozzle opening making an even greater access passage.

There is always a negative pressure in the crankcase. At high intake manifold vacuums, the diaphragm will be pulled against the valve nozzle tending to close it, but some flow of gases from the crankcase will occur through leakage points around the edge of the valve nozzle or through a limited access port. The crankcase will, therefore, be under a negative pressure. This negative pressure in the crankcase will also tend to keep the valve shut by pulling on the larger area of the diaphragm. However, as the intake manifold vacuum becomes weaker, the crankcase vacuum becomes weaker; and once the spring has opened the valve, the crankcase vacuums will become increasingly weaker tending to allow the spring to push the diaphragm even further away. In this regard, it is to be noted that the terms used herein stating that negative pressures or vacuums becomes weaker, or more absolute or more positive, means that the pressure is approaching atmospheric pressure.

The crankcase pressures exert only a small diaphragm-lifting pressure. These small diaphragm-lifting pressures from the crankcase exert their force on a much larger area of the diaphragm in the regulator of this invention however. These crankcase pressures exert their force over an annular portion of the diaphragm extending from the diaphragm flexure or bending line into about the circular area of the diaphragm adjacent the open end of the valve nozzle. The diaphragm-lifting action of the increasingly more absolute crankcase pressures on the larger area of the diaphragm increasingly releases the spring biasing force on the diaphragm and the spring pushes the diaphragm away from the valve nozzle providing a maximum size passage for unrestricted flow into the valve nozzle at high blowby flow rates. Conversely, any damage to the system whereby excessively high vacuums are created in the crankcase will cause the diaphragm to be pulled shut against the valve nozzle until crankcase pressures return to a more absolute valve.

This arrangement makes possible the excellent performance of the regulator under low intake manifold vacuums when the blowby volume is high, by providing a large gas outlet passage with a low enough pressure drop to maintain negative pressures in the crankcase at high engine speeds and work loads. Prior art systems do not operate in the same way, as shown in FIG. 8. While the curve A shows that the amount of blowby gases which must be removed from the crankcase increases, the curves B and D show that those valves do not function to remove this volume of blowby gases, but rather fall below the curve A requirements. Curve C, representing the performance of the regulator of this invention, does function to remove blowby gases even at very low maifold vacuums (curve C is located above curve A because it was set to draw off an excess of gas, the excess being air drawn into the crankcase through an orifice in the oil fill cap, so as to purge or clean the crankcase; the curve could be located closer to curve A if little purging was desired). The regulator of this invention operates effectively because it is responsive to crankcase pressures as well as intake manifold pressures, whereas the prior art valve generally respond only to intake manifold pressures. In this regard it is desirable to provide a large size diaphragm and a small size valve nozzle opening so that the ratio of crankcase pressure responsive diaphragm area to intake manifold pressure responsive diaphragm area will be large.

Figure 5:
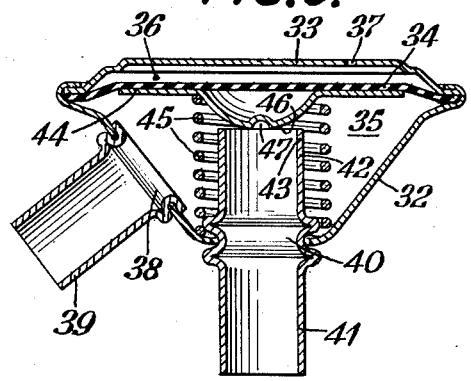
FIG. 5 is an elevational section of another embodiment of the regulator shown in FIG. 4.

A typical production model of the regulator is shown in FIG. 5. The regulator has a cone-shaped body 32 and a cap 33 with a flexible diaphragm 34 sealingly clamped in between, providing a first chamber 35 and a second chamber 36. The second chamber 36 is vented to the atmosphere by a hole 37 in the cap 33. A gas inlet 38 is formed in the side of the body with a crankcase connector 39 extending therefrom. A gas outlet 40 is formed in the center of the body with an engine manifold connector 41 therein and a valve nozzle 42 with an open end 43 extending into the first chamber. The gas inlet is a short piece of open ended tubing, as is the gas outlet-valve nozzle. A diaphragm plate 44 having a central dome-shaped or pushed-out area is located between the diaphragm 34 and the open end 43 of the valve nozzle 42. The dome of the plate is thus located adjacent to the open end of the nozzle and will close the nozzle when drawn into the open end by negative pressures in the nozzle. The pressure plate and diaphragm is urged away from the nozzle by the biasing action of the compressed spring 45. Since the spring 45 pushes the diaphragm plate 44 against the diaphragm, the two act as one member in responding to pressures in the regulator and it is not necessary to attach the palte to the diaphragm with a rivet. This free floating action of the diaphragm allows the dome-shaped portion 46 to achieve a good fit against the open end 43 of the nozzle 42 even after long usage.

Since the amount of blowby gas flow at low engine speeds is relatively small, it is not necessary to keep the valve nozzle completely open at this point as discussed above. By putting a vent in either the valve nozzle or diaphragm plate which will always be open, even when the diaphragm plate is against the valve nozzle, a passage for minimal blowby gas flow is efficiently provided.

Figure 6:
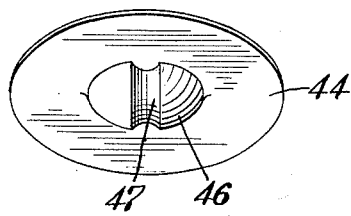
FIG. 6 is a perspective view of a diaphragm plate used in the flow regulator shown in FIG. 5.

In the regulator of FIG. 5 a crease or groove 47 is formed in the dome 46 of the diaphragm plate 44. The high vacuums in the manifold at low engine speeds are allowed to pull down the diaphragm plate so that the valve nozzle is closed except for the vent through the groove 47 whereby gases are drawn into the valve nozzle. The groove need not extend completely across the dome, as shown in FIG. 6, but may be only on one side of the dome, depending on the flow capacity needed in this opening. Additionally, the vent may be in the valve nozzle itself in the form of a hole or lip at its upper edge which will prevent complete sealing of the valve nozzle opening by the diaphragm plate. This applies to the nozzle with either the dome-shaped diaphragm plate of FIG. 5 or the flat plate shown in FIG. 4.

The vent or groove 47 provides a path for low blowby flow rates then in this embodiment. When the blowby flow rate increases and the vacuum becomes weaker, the combined force of the biasing spring and the reduced or more absolute crankcase pressures on the larger diaphragm area cause the diaphragm to back further away from the valve nozzle allowing a greater flow of blowby gases. When the blowby rate is highest, the valve nozzle opening will be at its maximum. The strength of the spring is selected to cause an opening of the valve nozzle at some selected intake manifold vacuum, intermediate the high and low manifold vacuums. The regulator in FIG. 8, represented by curve C, had a vent as shown and a spring-diaphragm area arrangement designed to open the valve nozzle at about 15 inches mercury manifold vacuum.

Figure 7:
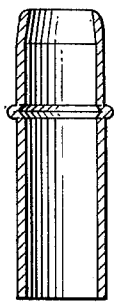
FIG. 7 is an elevational section of another embodiment of the valve nozzle shown in the regulator of FIGS. 4 and 5.

It is important to provide unrestricted passages for the blowby gas flow since unnecessary restrictions cause harmful pressure drops. Any unnecessary pressure drops along the conduits, in the regulator itself and the holes in the intake manifold and valve cover, will cause a loss in the gas drawing power of the system. This is especially significant at low engine manifold vacuums when the vacuum may be an inch or less of mercury. Since it is desirable to maintain a negative pressure in the crankcase to help draw out the blowby gases, there should be no unnecessary pressure drop causing restrictions in the regulator and conduit passages. For this reason a relatively large cross-sectional area gas outlet tube is desired to give a high blowby gas flow capacity. However, when a large size tube is used, the area of the diaphragm on which the intake manifold pulls will also increase in area, thereby upsetting the responsiveness of the regulator to crankcase pressures. To maintain a large flow capacity in the system while still providing crankcase pressure responsiveness, a gas outlet tube of the type shown in FIG. 7 may be used. This tube has a constricted opening of the venturi or flow nozzle type. The flow capacity of this nozzle is much higher than the flow capacity of a cylindrical tube having an opening of the same cross-sectional area because the venturi nozzle can have an orifice coefficient of 0.9 or higher, while the tube has an orifice coefficient of only 0.6. Therefore, the flow capacity of the valve nozzle can be increased by using a venturi nozzle having an orifice coefficient of 0.9 or higher. This results in an increase in the ratio of effective diaphragm area to valve opening area of 50 percent without an increase in the size of diaphragm or decrease in the flow capacity of the regulator.

Since the conduit and flow regulator may provide an opening from the intake manifold to the crankcase, it may be necessary to position a flash arrester in this line to prevent the passage of a flame to the crankcase. A suitable flash arrester could consist of a chamber containing a bed of steel shot between the outlet of the flow regulator and the intake manifold.

This application is a continuation-in-part of copending application Serial No. 149,250, filed Nov. 1, 1961.

What is claimed is:
1. A flow regulator for use in a crankcase ventilating passage between the crankcase and the intake manifold of an internal combustion engine, said flow regulator comprising a casing, a flexible diaphragm within the casing dividing the casing into a first chamber and a second chamber, a vent hole in the casing wall above the second chamber to provide for atmospheric loading of the diaphragm, a gas inlet into said first chamber, said gas inlet having an engine crankcase connector, a gas outlet from said first chamber, said gas outlet having an engine intake manifold connector, a valve nozzle inside the first chamber, one end of said valve nozzle communicating with the gas outlet, the other end of said valve nozzle teminating in an open end adjacent the flexible diaphragm, the open end of the valve nozzle being at least partially blocked to the passage of gases therethrough by the flexible diaphragm when the flexible diaphragm is drawn to the open end by engine intake manifold negative pressures in the valve nozzle, and a spring in said casing between a wall of said casing and the flexible diaphragm, said spring biasing the flexible diaphragm away from the valve nozzle to keep open said valve nozzle open end for outlet gas pressures equal to and more positive than a preselected outlet gas pressure.

2. A flow regulator for use in a crankcase ventilating passage between the crankcase and the intake manifold of an internal combustion engine, said flow regulator comprising a casing, a flexible diaphragm peripherally clamped within the casing dividing the casing into a first chamber and a second chamber, a vent hole in the casing wall above the second chamber to provide for atmospheric loading of the diaphragm, a diaphragm plate on the first chamber side of the diaphragm and adapted to move with the diaphragm, a gas inlet into said first chamber, said gas inlet having an engine crankcase connector, a gas outlet from said first chamber, said gas outlet having an engine intake manifold connector, a valve nozzle inside the first chamber, one end of said valve nozzle communicating with the gas outlet, the other end of said valve nozzle terminating in an open end adjacent the diaphragm plate, the open end of the valve nozzle being at least partially blocked to the passage of gases therethrough by the diaphragm plate when the flexible diaphragm and diaphragm plate are drawn to the open end of the valve nozzle by engine intake manifold negative pressures in the valve nozzle, and a spring in said first chamber between the casing wall and the diaphragm plate, said spring biasing the diaphragm plate and flexible diaphragm away from the open end of valve nozzle to keep open said valve nozzle open end for outlet gas pressures equal to and more positive than a preselected outlet gas pressure.

3. A flow regulator for use in a crankcase ventilating passage between the crankcase and the intake manifold of an internal combustion engine, said flow regulator comprising a casing, a flexible diaphragm peripherally clamped within the casing dividing the casing into a first chamber and a second chamber, a vent hole in the casing wall above the second chamber to provide for atmospheric loading of the diaphragm, a diaphragm plate on the first chamber side of the diaphragm and adapted to move with the diaphragm, said diaphragm plate having a centrally located groove therein, a gas inlet into said first chamber, said gas inlet having an engine crankcase connector, a gas outlet from said first chamber, said gas outlet having an engine intake manifold connector, a valve nozzle inside the first chamber, one end of said valve nozzle communicating with the gas outlet, the other end of said valve nozzle terminating in an open end adjacent the diaphragm plate, the open end of the valve nozzle being partially blocked to the passage of gases therethrough by the diaphragm plate when the flexible diaphragm and diaphragm plate are drawn to the open end of the valve nozzle by engine intake manifold negative pressures in the valve nozzle, the groove in the diaphragm plate providing a limited access port into the valve nozzle, and a spring in said first chamber between the casing wall and the diaphragm plate, said spring biasing the diaphragm plate and flexible diaphragm away from the open end of valve nozzle to keep open said valve nozzle open end for outlet gas pressures equal to and more positive than a preselected outlet gas pressure.

4. A flow regulator for use in a crankcase ventilating passage between the crankcase and the intake manifold of an internal combustion engine, said flow regulator comprising a casing, a flexible diaphragm within the casing dividing the casing into a first chamber and a second chamber, a vent hole in the casing wall above the second chamber to provide for atmospheric loading of the diaphragm, a gas inlet into said first chamber, said gas inlet having an engine crankcase connector, a gas outlet from said first chamber, said gas outlet having an engine intake manifold connector, a valve nozzle inside the first chamber, one end of said valve nozzle communicating with the gas outlet, the other end of said valve nozzle terminating in a flow nozzle opening having an orifice coefficient of at least about 0.9, said flow nozzle opening located adjacent the flexible diaphragm and being partially blocked to the passage of gases therethrough by the flexible diaphragm when the flexible diaphragm is drawn to the open end of the flow nozzle by engine intake manifold negative pressures in the valve nozzle, and a spring in said casing between a wall of said casing and the flexible diaphragm, said spring biasing the flexible diaphragm away from the valve nozzle to keep open said valve nozzle open end for outlet gas pressures equal to and more positive than a preselected outlet gas pressure.

5. A flow regulator for use in a crankcase ventilating passage between the crankcase and the intake manifold of an internal combustion engine, said flow regulator comprising a casing, a flexible diaphragm peripherally clamped within the casing dividing the casing into a first chamber and a second chamber, a vent hole in the casing wall above the second chamber to provide for atmospheric loading of the diaphragm, a diaphragm plate on the first chamber side of the diaphragm and adapted to move with the diaphragm, a gas inlet into said first chamber, said gas inlet having an engine crankcase connector, a gas outlet from said first chamber, said gas outlet having an engine intake manifold connector, a valve nozzle inside the first chamber, one end of said valve nozzle communicating with the gas outlet, the other end of said valve nozzle terminating in a flow nozzle opening having an orifice coefficient of at least about 0.9, said flow nozzle opening located adjacent the diaphragm plate and being partially blocked to the passage of gases therethrough by the diaphragm plate when the flexible diaphragm and diaphragm plate are drawn to the opening by engine intake manifold negative pressures in the valve nozzle, and a spring in said first chamber between the casing wall and the diaphragm plate, said spring biasing the diaphragm plate and flexible diaphragm away from the open end of valve nozzle to keep open said valve nozzle open end for outlet gas pressures equal to and more positive than a preselected outlet gas pressure.

6. A flow regulator for use in a crankcase ventilating passage between the crankcase and the intake manifold of an internal combustion engine, said flow regulator comprising a casing, a flexible diaphragm peripherally clamped within the casing dividing the casing into a first chamber and a second chamber, the second chamber having a vent in the wall of the casing to provide for atmospheric loading of the diaphragm, a diaphragm plate inside the first chamber on the diaphragm and adapted to move with the diaphragm, a gas inlet tube extending through the wall of the casing having an open end terminating within the first chamber but removed from the diaphragm plate surface, the other open end of the inlet tube outside the casing having an engine crankcase connector, a gas outlet tube extending through the wall of the casing, the open end of the gas outlet tube outside the casing having an engine intake manifold connector, the other end of the tube inside the first chamber terminating in a valve nozzle adjacent the central portion of the diaphragm plate surface, the open end of the valve nozzle being partially blocked to the flow of gases therethrough by the diaphragm plate when the flexible diaphragm and diaphragm plate are drawn to the valve nozzle by engine intake manifold negative pressures therein, and a spring in said first chamber between the casing wall and the diaphragm plate, said spring biasing the diaphragm plate and flexible diaphragm away from the valve nozzle for outlet gas pressures equal to and more positive than a preselected outlet gas pressure.

7. The flow regulator of claim 6 wherein the valve nozzle opening is a venturi nozzle having an orifice coefficient of at least about 0.9.

8. The flow regulator of claim 6 wherein the diaphragm plate has a centrally located crease allowing a passage for gases into the valve nozzle opening when the diaphragm plate is drawn against the valve nozzle opening.

9. The flow regulator of claim 6 wherein the valve nozzle tube has a crease on its upper edge allowing a passage for gases into the valve nozzle tube when the diaphragm plate is drawn against the valve nozzle opening.

10. A crankcase ventilating system comprising, in combination, an internal combustion engine having a crankcase and an intake manifold, a flow regulator in a crankcase ventilating passage between the crankcase and the intake manifold, said flow regulator comprising a casing, a flexible diaphragm within the casing dividing the casing into a first chamber and a second chamber, a vent hole in the casing wall above the second chamber to provide for atmospheric loading of the diaphragm, a gas inlet into said first chamber, said gas inlet having an engine crankcase connection, a gas outlet from said first chamber, said gas outlet having an engine intake manifold connection, a valve nozzle inside the first chamber, one end of said valve nozzle communicating with the gas outlet, the other end of said valve nozzle terminating in an open end adjacent the flexible diaphragm, the open end of the valve nozzle being at least partially blocked to the passage of gases therethrough by the flexible diaphragm when the flexible diaphragm is drawn to the open end by engine intake manifold negative pressures in the valve nozzle, and a spring in said casing between a wall of said casing and the flexible diaphragm, said spring biasing the flexible diaphragm away from the valve nozzle to keep open said valve nozzle open end for outlet gas pressures equal to and more positive than a preselected outlet gas pressure.

11. A crankcase ventilating system comprising, in combination, an internal combustion engine having a crankcase and an intake manifold, a flow regulator in a crankcase ventilating passage between the crankcase and the intake manifold, said flow regulator comprising a casing, a flexible diaphragm peripherally clamped within the casing dividing the casing into a first chamber and a second chamber, the second chamber having a vent in the wall of the casing to provide for atmospheric loading of the diaphragm, a diaphragm plate inside the first chamber on the diaphragm and adapted to move with the diaphragm, a gas inlet tube into the casing and having an open end terminating with the first chamber but removed from the diaphragm plate surface, the other end of the inlet tube outside the casing having an engine crankcase connection, a gas outlet tube extending through the wall of the casing, the open end of the gas outlet tube outside the casing having an engine intake manifold connection, the other end of the tube inside the first chamber terminating in a valve nozzle adjacent the central portion of the diaphragm plate surface, the open end of the valve nozzle being partially blocked to the flow of gases therethrough by the diaphragm plate when the flexible diaphragm and diaphragm plate are drawn to the valve nozzle by engine intake manifold negative pressures therein, and a spring in said first chamber between the casing wall and the diaphragm plate, said spring biasing the diaphragm plate and flexible diaphragm away from the valve nozzle for outlet gas pressures equal to and more positive than a preselected outlet gas pressure.

References Cited in the file of this patent
UNITED STATES PATENTS

| | | |
|---|---|---|
| 2,318,157 | Heiser | May 4, 1943 |
| 2,775,960 | Druzynski | Jan. 1, 1957 |
| 2,847,258 | Burdick | Aug. 12, 1958 |
| 3,056,420 | Dietrich | Oct. 2, 1962 |